United States Patent
Murata et al.

[11] Patent Number: 5,873,661
[45] Date of Patent: Feb. 23, 1999

[54] RECORDING APPARATUS CAPABLE OF DATA-READ CONTROL

[75] Inventors: Takayuki Murata, Kawasaki; Hiroshi Fukui, Yokosuka; Shinichi Omo, Kawasaki; Akira Kuronuma, Kawasaki; Masahiko Umezawa, Kawasaki, all of Japan

[73] Assignee: Canon Kabushiki Kaisha, Tokyo, Japan

[21] Appl. No.: 769,537

[22] Filed: Dec. 19, 1996

[30] Foreign Application Priority Data

Dec. 20, 1995 [JP] Japan ................................. 7-332008

[51] Int. Cl.⁶ ..................................................... B41J 2/01
[52] U.S. Cl. ............................... 400/124.04; 400/120.05; 347/13
[58] Field of Search ..................... 400/120.04, 120.05, 400/120.08, 120.09, 124.04; 347/13

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata | 347/13 |
| 4,515,487 | 5/1985 | Minami | 400/124.09 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 4,922,271 | 5/1990 | Nilsson | 400/124.08 |
| 5,079,571 | 1/1992 | Eriksen | 347/40 |
| 5,173,717 | 12/1992 | Kishida | 347/13 |
| 5,330,276 | 7/1994 | Tanida | 400/124.04 |
| 5,385,414 | 1/1995 | Shirotori | 400/124.04 |
| 5,572,329 | 11/1996 | Otsubo | 347/40 |
| 5,621,440 | 4/1997 | Takahashi | 347/40 |
| 5,625,389 | 4/1997 | Eriksen | 347/40 |
| 5,629,771 | 5/1997 | Mikami | 347/40 |

FOREIGN PATENT DOCUMENTS

| | | | |
|---|---|---|---|
| 59-123670 | 7/1984 | Japan | 346/1.1 |
| 59-138461 | 8/1984 | Japan | 346/1.1 |

*Primary Examiner*—John Hilten
*Assistant Examiner*—Steven S. Kelley
*Attorney, Agent, or Firm*—Fitzpatrick, Cella, Harper & Scinto

[57] ABSTRACT

A recording apparatus includes a recording head. The recording head is provided with a recording device string made up of a plurality of recording elements. The recording device string is arranged at a specified angle in relation to the direction perpendicular to the direction in which the recording head moves. A plurality of recording elements is divided into a plurality of blocks and sequentially driven in units of blocks at a specified interval. When recording is performed from a position other than an end of the recording device string, the drive sequence of the blocks is changed. The block including the recording element corresponding to a recording start position is first driven and recording data is read with the effective use of a signal line in a data bus.

18 Claims, 17 Drawing Sheets

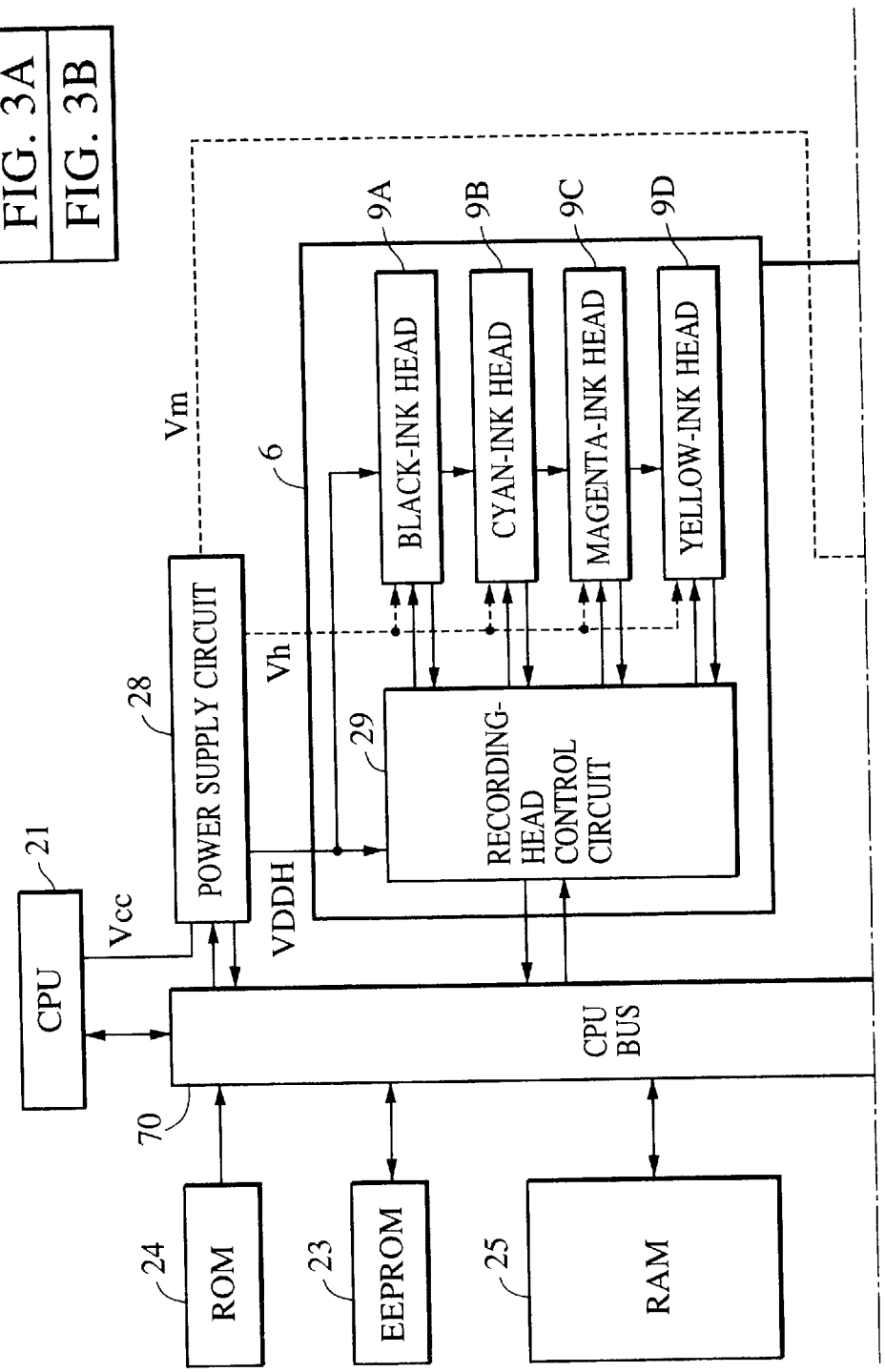

NORMAL

RECORDING APPARATUS CAPABLE OF DATA-READ CONTROL

BACKGROUND OF THE INVENTION

1. Field of the Invention

The present invention relates to recording apparatuses, and more particularly, to an recording apparatus which performs recording with an ink-jet recording head being moved.

2. Description of the Related Art

As information processing units, such as copiers, word processors, and computers, and communication units, such as facsimile machines, have become widely spread, a recording apparatus for digital image recording using an ink-jet recording head has been rapidly used as an image forming (recording) apparatus for these units. In such a recording apparatus, a recording head assembly (multi-head) is generally used in which a plurality of recording elements is integrated and arranged, and ink is discharged from ink discharging outlets provided for each recording head.

Electric signals are applied sequentially to recording elements of a recording head having the above-described configuration to heat ink, and ink droplets are discharged for recording. Since in the usual case, a carriage on which the recording heads are mounted moves during recording, in one cycle of the recording operation the position on the recording medium of the last recorded dot shifts from that of the first recorded dot. To correct this shift, some apparatuses have a carriage on which a recording head is mounted at an angle with such shift being taken into consideration.

FIGS. 10A and 10B show a recording operation in a case in which a recording head having 48 recording elements arranged in a row is used, the recording elements being divided into 16 blocks each having three recording elements, and 16 heat pulses are applied in a time-division manner to each block for recording. FIG. 10A illustrates recorded-dot positions in a case in which the recording head is mounted to the carriage with no slant angle. The direction in which ink discharging outlets are arranged is in parallel to the direction in which the recording medium is fed. FIG. 10B illustrates recorded-dot positions in a case in which the recording head is mounted at an angle to the carriage. The direction in which ink discharging outlets are arranged is slanted against the direction in which the recording medium is fed.

In a case shown in FIGS. 10A and 10B, recording is performed at a recording density of 360 dots per inch (dpi) in the carriage-move direction. A heat pulse is applied to the recording elements 1, 17, and 33 at the first timing, to the recording elements 2, 18, and 34 at the next timing, to the recording elements 3, 19, and 35 at the further next timing, and so on to the recording elements 16, 32, and 48 at the last timing.

When recording is performed with the recording head being mounted without a slant as shown in FIG. 10A, recorded-dot positions shift as heat pulses are applied to recording elements. When recording is performed with the recording head being mounted at an angle as shown in FIG. 10B, recorded-dot positions do not shift and recording is performed at the ideal positions.

FIG. 11 is a timing chart indicating timing for driving a recording head. As shown in FIG. 11, with a combination of four driving signals (BEi1*, BEi2*, BEi3*, and BEi4*), a heat pulse signal (BkENB) is applied to 16 recording elements sequentially.

Recording data is stored in a data buffer. With the use of a 16-bit bus, recording data is read from the data buffer in units of 16 bits. Recording data is transferred to a 48-bit shift register provided for the recording head by reading 16-bit data three times.

When recording is performed with the recording head being mounted at an angle in the conventional apparatus, it takes much time to read recording data from the data buffer which stores the data.

Since the recording head is mounted at an angle in a case shown in FIG. 10B, a dot group 1101 having 16 dots, a dot group 1102 having 16 dots, and a dot group 1103 having 16 dots, 48 dots in total, are recorded in one recording cycle. When these dots are viewed in terms of forming an image on a recording medium, these dot groups belong to the n-th line, the n-1-th line and the n-2-th line, respectively, if each line of dot positions is counted in the carriage-move direction. In other words, these dot groups are shifted by one line each in the carriage-move direction.

Recording data is usually stored in the data buffer according to the two-dimensional pixel arrangement of an image to be formed. In a case shown in FIG. 10B, for example, recording data corresponding to pixels on the n-th line is stored as a group in the data buffer at an area having successive addresses, recording data corresponding to pixels on the n-1-th line is stored as a group in the data buffer at an area having successive addresses, and recording data corresponding to pixels on the n-2-th line is stored as a group in the data buffer at an area having successive addresses. Therefore, the 16 resulting blocks are driven at different recording timings. When the recording head is mounted at an angle as in a case shown in FIG. 10B, recording data has to be read from the data buffer at different addresses at intervals of 16 bits.

When data read from the data buffer is transferred to the recording head via the 16-bit bus, 16 bits in the n-th line data need to be read for recording at the recording elements 1 to 16, 16 bits in the n-1-th line data need to be read for recording at the recording elements 17 to 32, and 16 bits in the n-2-th line data need to be read for recording at the recording elements 33 to 48, in one cycle of recording. At least three accesses to the data buffer are required.

If recording starts at the recording element 9 (that is, the position shifted by eight recording elements) due to a relationship with feed control for a recording medium, for example, data needs to be read in units of eight bits as in a case shown in FIG. 12B.

In cases shown in FIGS. 10A, 10B, 12A, and 12B, 16 heat pulses applied to a recording head form one group. Since data for each line is stored in the data buffer at an area having successive addresses, in a case shown in FIG. 12A in which recording is performed sequentially from the recording element 1, data is read from the data buffer in units of 16 bits via the 16-bit bus, is transferred to the recording head as is, and the corresponding recording elements are driven. In a case shown in FIG. 12B in which the recording start position shifts by, for example, eight recording elements, however, data has to be accessed in units of eight bits in order to read eight bits in the n-th line from the data buffer for the recording elements 9 to 16, other eight bits in the n-th line from the data buffer for the recording elements 17 to 24, eight bits in the n-1-th line from the data buffer for the recording elements 25 to 32, and eight bits in the n-2-th line from the data buffer for the recording elements 33 to 40.

Therefore the number of times the data buffer is required to be accessed increases to six in one cycle of recording, the occupation rate of the bus in a time unit increases, and system performance decreases.

SUMMARY OF THE INVENTION

Accordingly, it is an object of the present invention to provide a recording apparatus which performs recording at a high speed while maintaining high recording image quality.

The above object of the present invention is achieved through the provision of a recording apparatus for performing recording on a recording medium by reciprocating in the direction perpendicular to the direction in which the recording medium is fed a recording head in which a plurality of recording elements are arranged at an angle in relation to the feed direction, the recording apparatus including storage means for storing recording data; transfer means for accessing the storage means to transfer stored recording data to the recording head; recording means for dividing the plurality of recording elements into a plurality of blocks, and sequentially driving the plurality of recording elements in units of blocks for recording according to the recording data transferred by the transfer means; and control means for changing the sequence of the block drive according to the recording start position in the plurality of recording elements such that the number of times the storage means is accessed by the transfer means becomes the minimum.

While the recording head in which a plurality of recording elements are arranged at an angle in relation to the direction in which a recording medium is fed reciprocates in the direction perpendicular to the feed direction in a recording operation, storage means for storing recording data is accessed to transfer the stored recording data to the recording head. As described above, according to the present invention, since the sequence of block drive is changed such that the number of times the storage means is accessed becomes the minimum, according to the recording-start position in a plurality of recording elements which are divided into a plurality of blocks, and the recording elements are sequentially driven in units of blocks for recording according to the transferred recording data.

The recording head may be an ink-jet recording head which discharges ink for recording. The recording head may be a recording head which discharges ink with the use of thermal energy and is provided with a heat energy conversion member for generating heat energy to be supplied to the ink.

The recording apparatus may be configured such that, with a data bus having a specified data-transfer width, recording data is read at the data-transfer width or less in one access to the storage means, and the data is transferred through the data bus. The data-transfer width may be 16 bits. The minimum access count may be the value obtained by dividing the number of the plurality of recording elements by the number of blocks used in one recording operation performed by the recording head, or the value plus 1.

The storage means may store the recording data according to the two-dimensional pixel arrangement of an image to be formed.

The recording apparatus may further include feed means for feeding the recording medium, scanning means for reciprocating the recording head, timing control means for controlling recording-start timing. The timing control means may include position detection means for detecting the position of the recording head and delay means for delaying the recording-start timing according to positional information output from the position detection means.

Time-division driving means for dividing the plurality of recording elements in the recording head into a plurality of blocks and for driving each resulting block in a time-division manner may be used for recording. Changing means for changing the drive sequence of the blocks may be used in recording control.

The recording head may be a color recording head. It may be configured that the color recording head is an ink-jet recording head for performing recording by discharging ink and includes a first head which discharges black ink, a second head which discharges yellow ink, a third head which discharges magenta ink, and a fourth head which discharges cyan ink.

BRIEF DESCRIPTION OF THE DRAWINGS

FIGS. 3, 3A and 3B are a block diagram showing an outlined configuration of a control circuit of the color recording apparatus shown in FIG. 1.

DESCRIPTION OF THE PREFERRED EMBODIMENT

Figure 1:
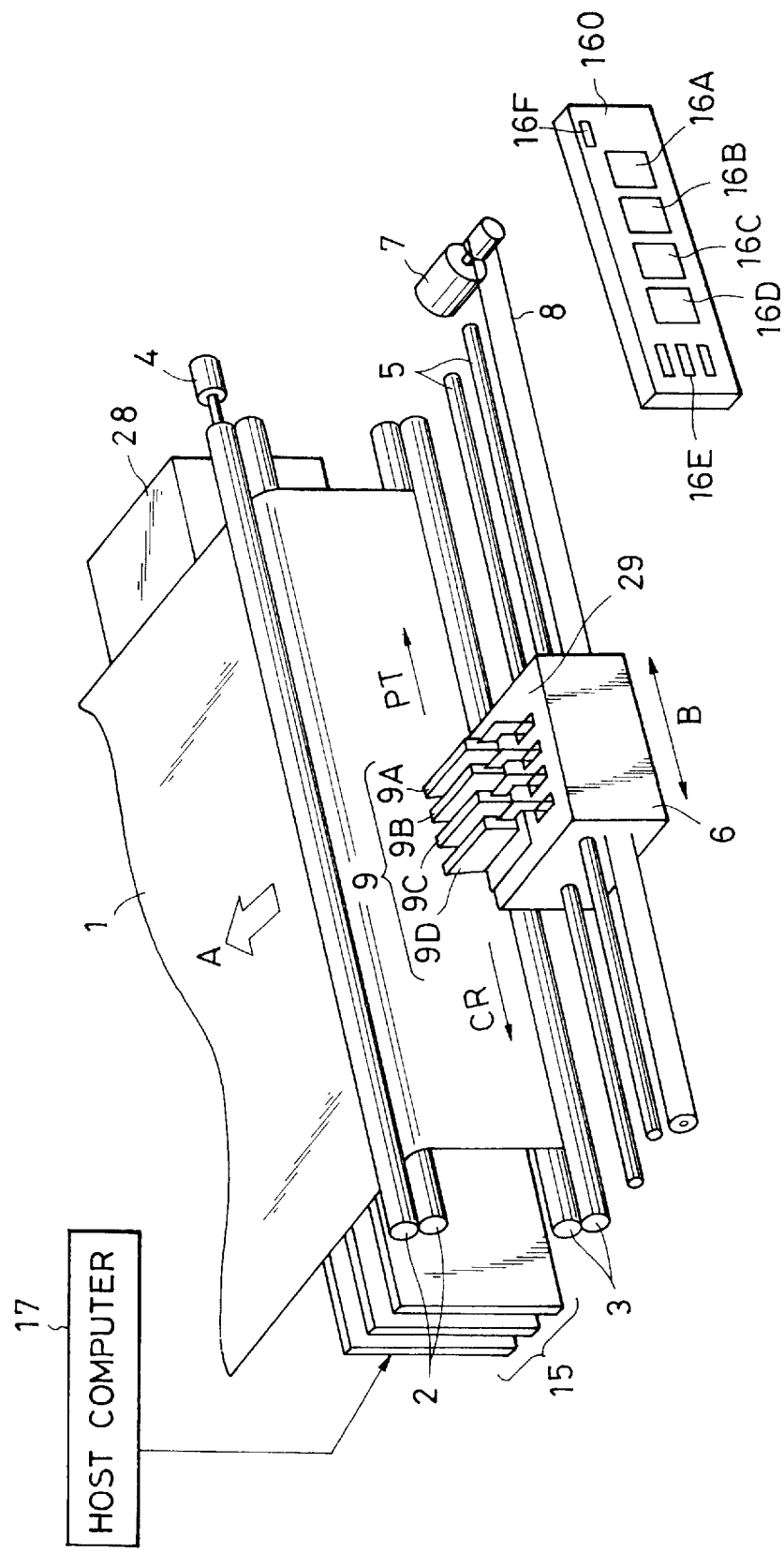
FIG. 1 is a perspective view of a color, ink-jet recording apparatus according to an embodiment of the present invention.

A preferred embodiment of the present invention will be described below in detail by referring to the drawings.

FIG. 1 is a perspective view of a color recording apparatus equipped with a recording head assembly which performs recording with an ink-jet method, according to a typical embodiment of the present invention.

In FIG. 1, a recording medium 1, such as a recording sheet and a plastic sheet, is supported by two pairs of feed rollers 2 and 3 disposed at the upper and lower ends in a recording area and is fed in the direction indicated by arrow A by the feed rollers 2 driven by a sheet feed motor 4. In front of the feed rollers 2 and 3, guide shafts 5 are provided in parallel thereto. Along the guide shafts 5, a carriage 6 reciprocates in the direction indicated by arrow B with the use of a belt 8 which transfers the rotational power of a carriage motor 7. In this recording apparatus, recording is performed only when the carriage 6 moves in one direction. More specifically, a recording head assembly 9 discharges ink for recording when the carriage 6 moves in the direction indicated by arrow PT, and the recording medium 1 is fed without recording when the carriage 6 moves in the direction indicated by arrow CR.

The recording head assembly 9 is mounted on the carriage 6 and is capable of color recording at a resolution of 360 dpi in the direction of carriage movement. The recording head assembly 9 has in the carriage scanning direction four heads 9A (black-ink head), 9B (cyan-ink head), 9C (magenta-ink head), and 9D (yellow-ink head) which discharge black ink (Bk), cyan ink (C), magenta ink (M), and yellow ink (Y), respectively. These heads 9A, 9B, 9C, and 9D are provided with ink discharging sections at their fronts, namely, on the surface facing the recording surface of the recording sheet 1 with a specified gap (0.8 mm for example). Each ink discharging section has a plurality of (for example, 48) ink discharging outlets disposed in a row in the direction perpendicular to the carriage scanning direction.

Figure 2:
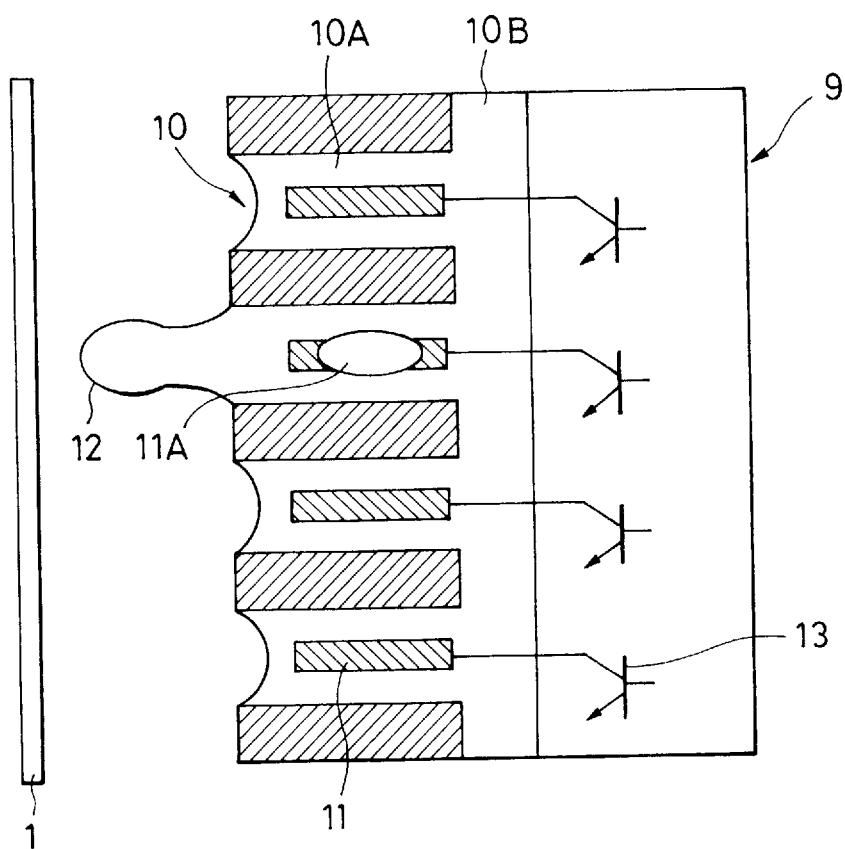
FIG. 2 is a typical cross section of a part of a discharging section in a recording head.

FIG. 2 is a typical vertical cross section of a part of the ink discharging section of a recording head. All the heads 9A to 9D have the same configuration.

In FIG. 2, on the head surface facing the recording medium 1, a plurality of ink discharging outlets 10 are vertically formed at a specified interval. According to recording information, an electrothermal conversion member (such as a heat generating resistor member) 11 provided correspondingly to each ink discharging outlet 10 is driven (heated by a current flowing through it). A bubble 11A is generated in ink due to a film boiling phenomenon and ink is discharged with the pressure thereof. A discharged ink droplet 12 is adhered to the recording medium 1 and recording is thus performed.

There is also shown in FIG. 2 an ink path 10A, a common ink section 10B, and heat drivers 13 for turning on and off electricity to the electrothermal conversion members 11.

By referring to FIG. 1, details will be described below. In FIG. 1, the carriage 6 is provided with a printed circuit board for a driving circuit 29 (driver) which performs the control described above.

A control circuit 15 for the recording apparatus includes a CPU and ROM and RAM connected thereto. The control circuit 15 receives a command signal and a data signal (recording information) from a host computer 17 (hereinafter called the host), and applies a driving power (heat power) to the electrothermal conversion members of the head 9A to 9D through the driving circuit 29 and the heat drivers 13.

An operation panel 160 is mounted on an exterior panel (not shown) of the recording apparatus. The operation panel 160 is equipped with various keys such as an on-line/off-line switching key 16A, a line feed key 16B, a form feed key 16C and a recording-mode switching key 16D, and a display section including a plurality of alarm lamps 16E, a power lamp 16F, and an LCD (not shown).

A power supply circuit 28 supplies power to various motors, the display section, and the control section 15.

Figure 3B:
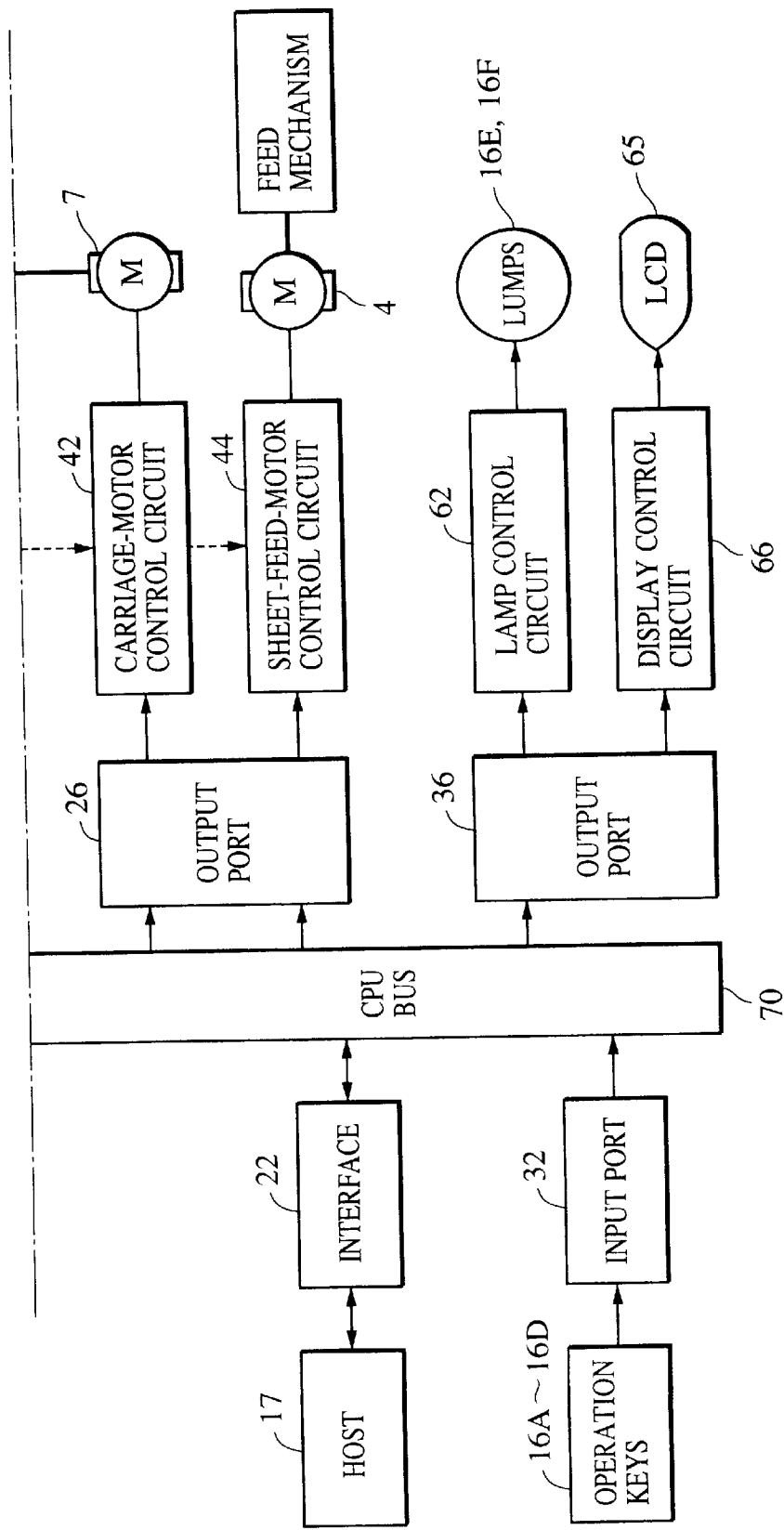

FIG. 3 is a block diagram showing an outlined configuration of the control circuit 15 of the color recording apparatus shown in FIG. 1.

A CPU 21, a kind of a microprocessor, is connected to the host 17 through an interface 22. The CPU 21 accesses a ROM 24 which stores control programs, an EEPROM 23 which stores updatable control programs, processing programs, and various constant data items, and a RAM 25 which stores command signals and recording-information signals received from the host 17 through the interface 22, and controls recording operations according to information stored in these memory units. As described in the conventional apparatus, the RAM 25 stores recording data according to the two-dimensional pixel arrangement of an image to be formed.

The CPU 21 also operates the carriage motor 7 through an output port 26 and a carriage-motor control circuit 42 to move the carriage 6, and operates the sheet feed motor 4 through the output port 26 and a sheet-feed-motor control circuit 44 to operate feed mechanisms such as the feed rollers 2. The CPU further drives the heads 9A to 9D through the head driving circuit 29 according to recording information stored in the RAM 25 and records the desired image on the recording sheet 1.

The power supply circuit 28 outputs a logic driving voltage $V_{cc}$ (for example, 5 V) for operating the CPU 21, a voltage $V_m$ (for example, 30 V) for driving various motors, a heat voltage $V_h$ (for example, 25 V) for driving the recording head assembly 9, and a backup voltage $V_{DDH}$ for protecting the recording head assembly 9. The heat voltage $V_h$ is applied to the recording head assembly 9 and the backup voltage $V_{DDH}$ is applied to the recording-head control circuit 29 and the recording head assembly 9.

A command input from the operation keys 16A to 16D provided for the operation panel 160 is transferred to the CPU 21 through the input port 32, and an instruction from the CPU 21 is transmitted to a lamp control circuit 62. The lamp control circuit 62 turns on the alarm lamps 16E and the power lamp 16F according to the instruction sent from the CPU 21. An instruction from the CPU 21 is also transferred to a display control circuit 66 to show messages on the LCD 65.

In FIG. 3, a CPU bus 70 for connecting various elements to each other has 16 bits and is capable of transferring 16-bit data at a time.

Figure 4:
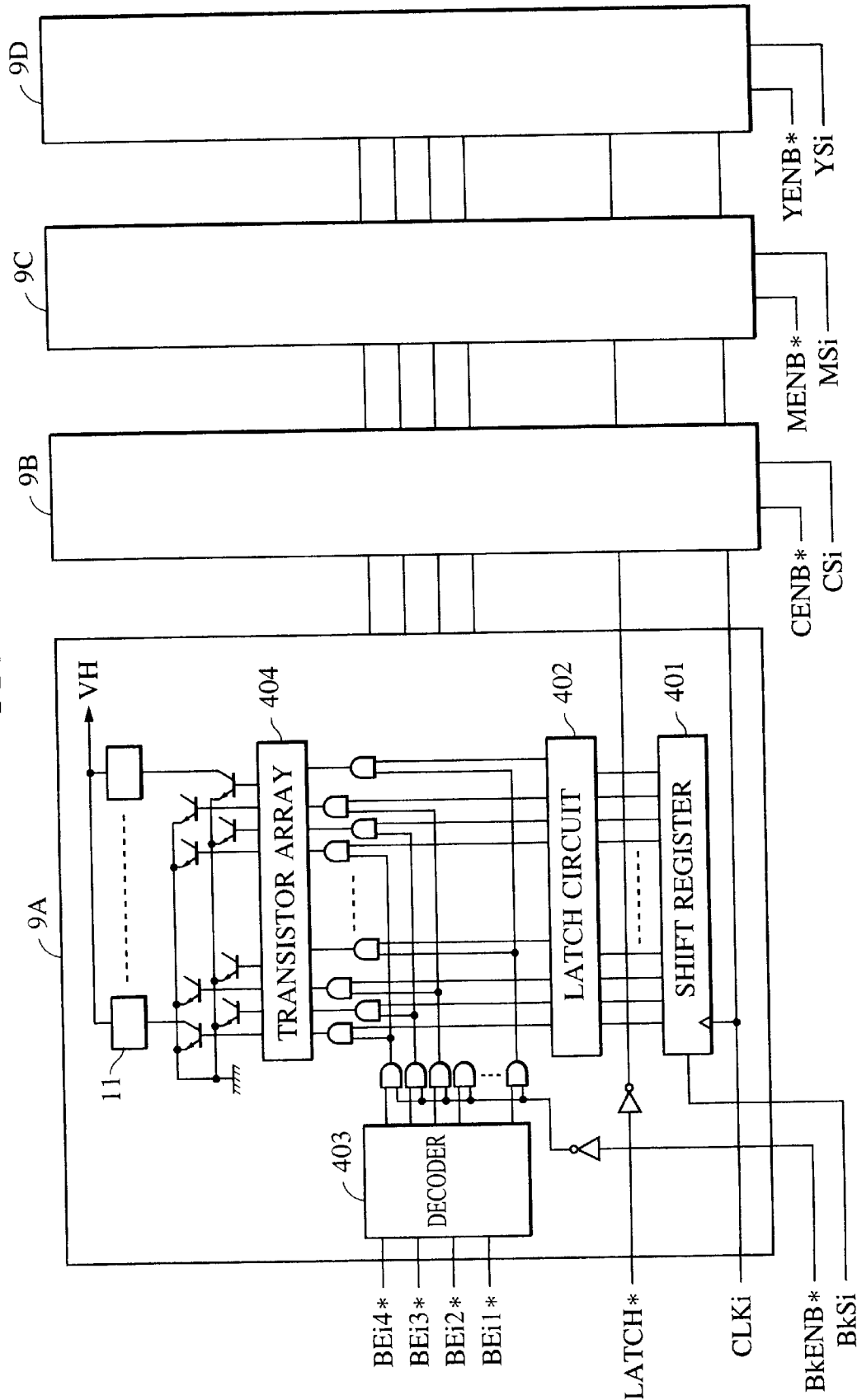
FIG. 4 is a block diagram of a recording-head driving circuit.

FIG. 4 is a block diagram of the recording-head driving circuit. Since the driving circuits for the black-ink head 9A, the cyan-ink head 9B, the magenta-ink head 9C, and the yellow-ink head 9C have the same configuration in the present embodiment, only a configuration of the driving circuit for the black-ink head 9A is illustrated in detail in FIG. 4.

In FIG. 4, recording data is sent to a 48-bit shift register 401 for each head through a serial data line BkSi, CSi, MSi, or YSi in synchronization with a CLKi clock signal. The recording data stored in the 48-bit shift register 401 is latched by a 48-bit latch circuit 402 by a LATCH* signal sent from the control circuit 15 at the start of recording. The recording elements of each head are divided into blocks and driven by four block-selection signals BEi1*, BEi2*, BEi3*, and BEi4*. These driving signals are input to a decoder 403 and decoded to select one of 16 blocks to which a transistor array 404 including 48 transistors corresponding to the number of the recording elements is divided.

Only when data to be recorded exists at a part of the latch circuit 402, which corresponds to the recording elements selected by a heat pulse (BkENB*) signal and the block-selection signals (BEi1*, BEi2*, BEi3*, and BEi4*), does a current flow through the selected heater 11 to heat it. Ink is discharged from the ink-discharging outlet for which the selected heater 11 is provided. The BkENB* signal has a pulse width sufficient for driving a specific recording element.

Figure 5:
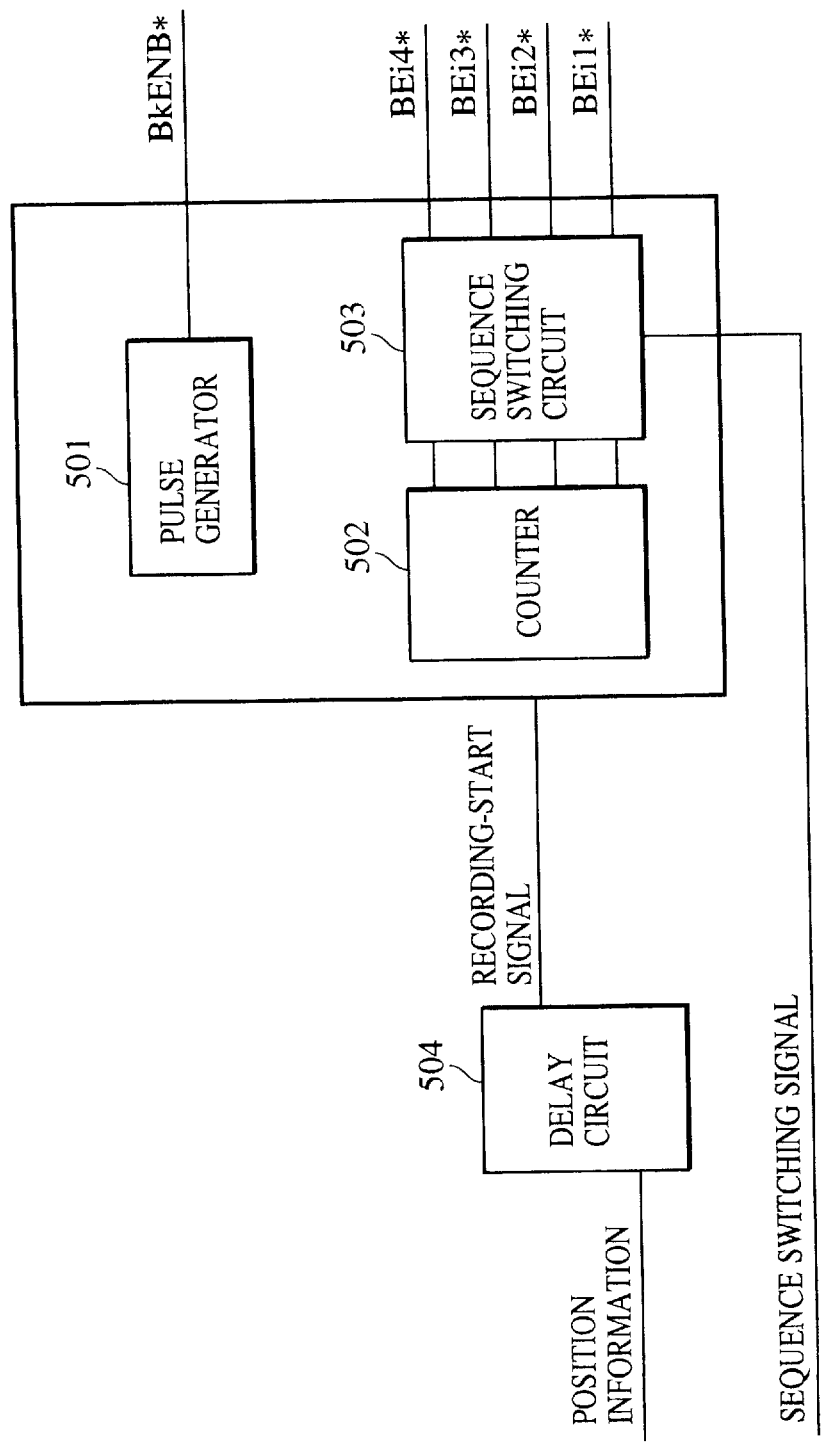
FIG. 5 is a block diagram of a recording-head control circuit for sending driving signals to a recording head to drive it.

FIG. 5 is a block diagram of the recording-head control circuit 29, which sends a drive signal to the recording head assembly 9 to drive it. In this figure, generation sections for the heat pulse signal and the block selection signals are illustrated. The recording-head control circuit 29 is also provided with a parallel/serial conversion circuit (not shown) which converts into a serial data recording data temporarily stored in the RAM 25 and received by the control circuit 29 through the 16-bit data bus under the control of the CPU 21, and a circuit (not shown) for sending the clock transferred from the CPU 21 to the recording head assembly 9. As understood from FIG. 3, the recording-head control circuit 29 controls all of the black-ink head 9A, the cyan-ink head 9B, the magenta-ink head 9C, and the yellow-ink head 9D. Since the driving circuits for these heads have the same configuration, only the configuration of a circuit controlling the black-ink head 9A is illustrated for convenience.

The circuit includes a pulse generator 501 for supplying a heat pulse unique to the black-ink head 9A, a counter 502 for generating the block selection signals, and a sequence switching circuit 503 for changing the sequence of selection by changing the sequence of the block selection signals (BEi1*, BEi2*, BEi3*, and BEi4*) input from the counter 502, with the use of a sequence switching signal sent from the CPU 21.

In a recording apparatus in which an encoder is used to generate recording timing, a delay circuit 504 for inputting a recording start signal to the pulse generator 501 and the counter 502 according to the positional information of the carriage sent from the CPU in accordance with the encoder output may be provided to delay a recording start position.

Recording control used in the color recording apparatus having the above-described configuration will be described in detail. In the description below, only the black-ink head 9A is described among the four heads, and a case in which 48 recording elements constituting the black-ink head 9A are divided into 16 blocks each having three recording elements is described. Blocks are named block 1, block 2, block 3, and so on to block 16. Each block has recording elements in the same way as in the conventional apparatus described by referring to FIGS. 10A, 10B, 12A, and 12B. In other words, block 1 includes recording elements 1, 17, and 33, block 2 includes recording elements 2, 18, and 34, block 3 includes recording elements 3, 19, and 35, block 4 includes recording elements 4, 20, and 36, block 5 includes recording elements 5, 21, and 37, and so on to block 16 includes recording elements 16, 32, and 48.

Figure 6:
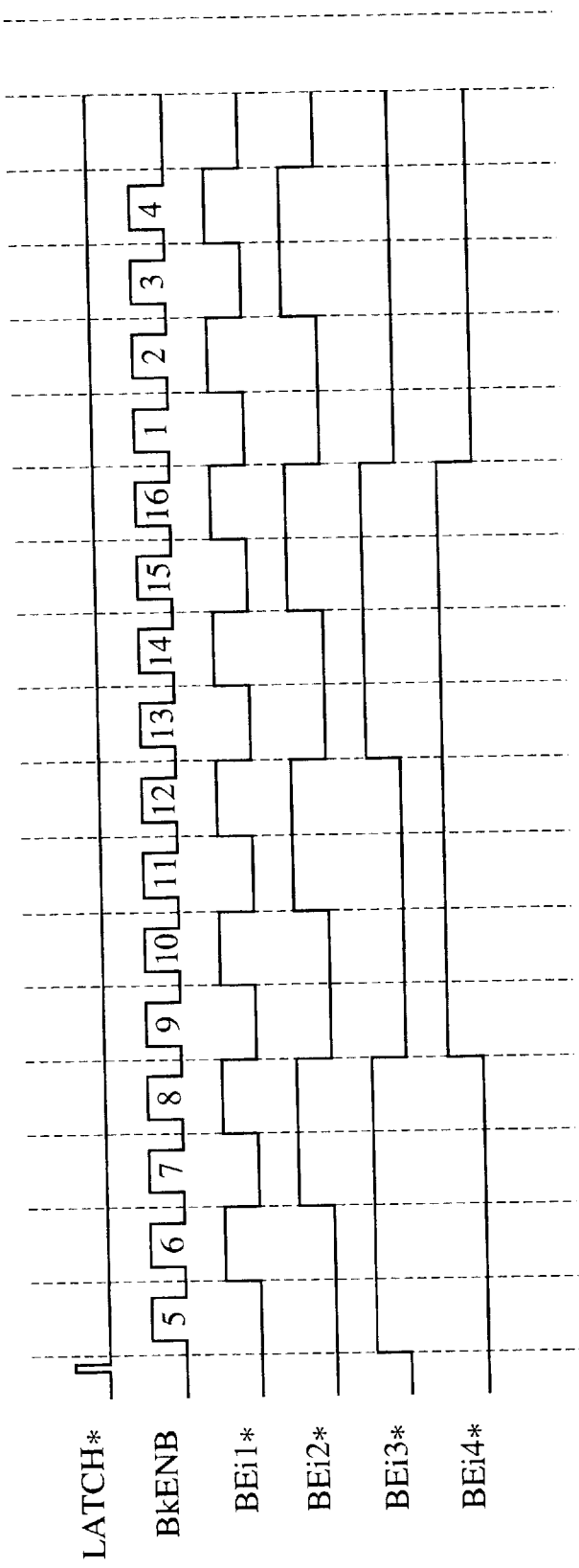
FIGS. 6 and 7 are timing charts indicating recording-head driving timing for black ink.
Figure 7:
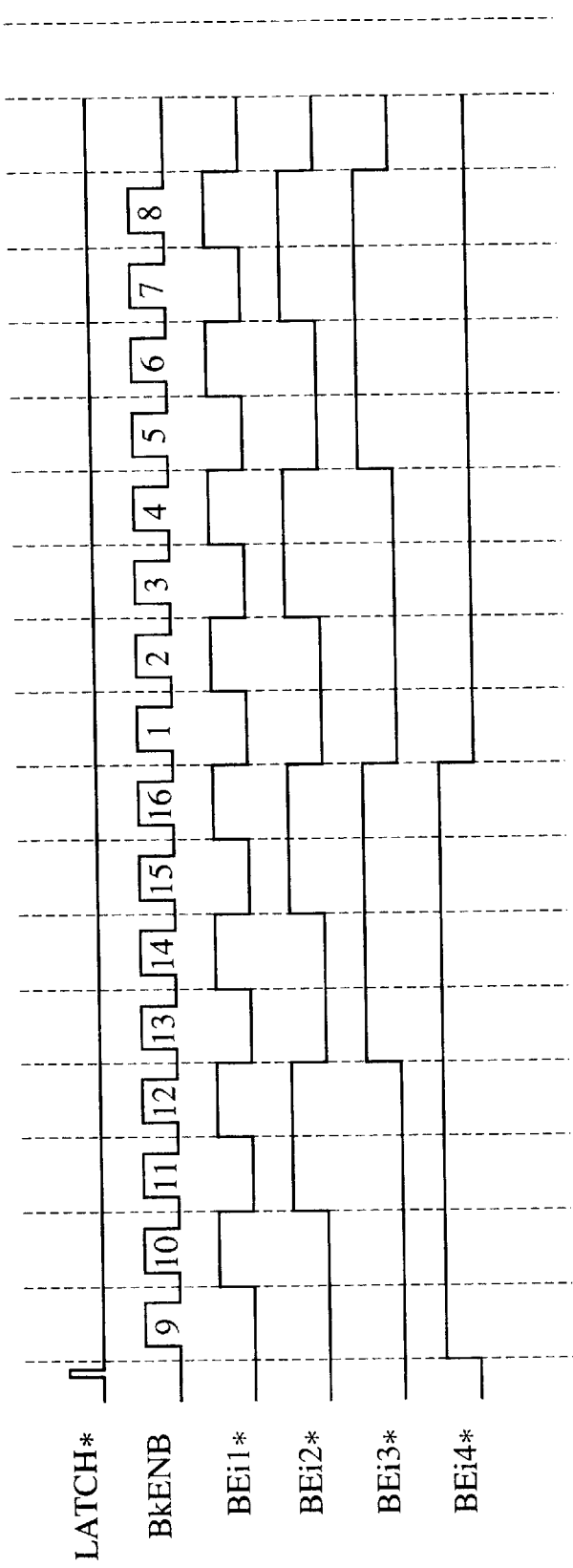

FIGS. 6 and 7 are timing charts illustrating driving timing for the black-ink head 9A. Numerals attached to pulses of the heat pulse signal (BkENB) indicate the block numbers of the resulting blocks.

Figure 11:
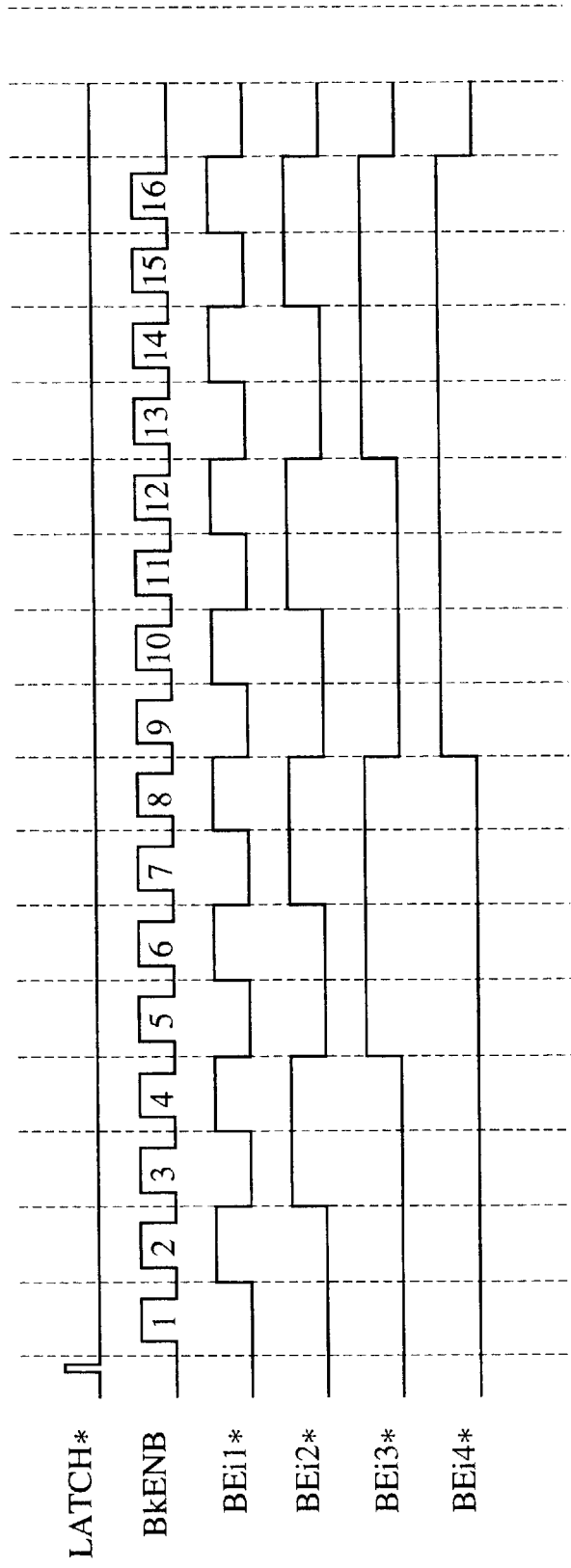
FIG. 11 is a timing chart indicating recording-head driving timing.
Figure 12A:
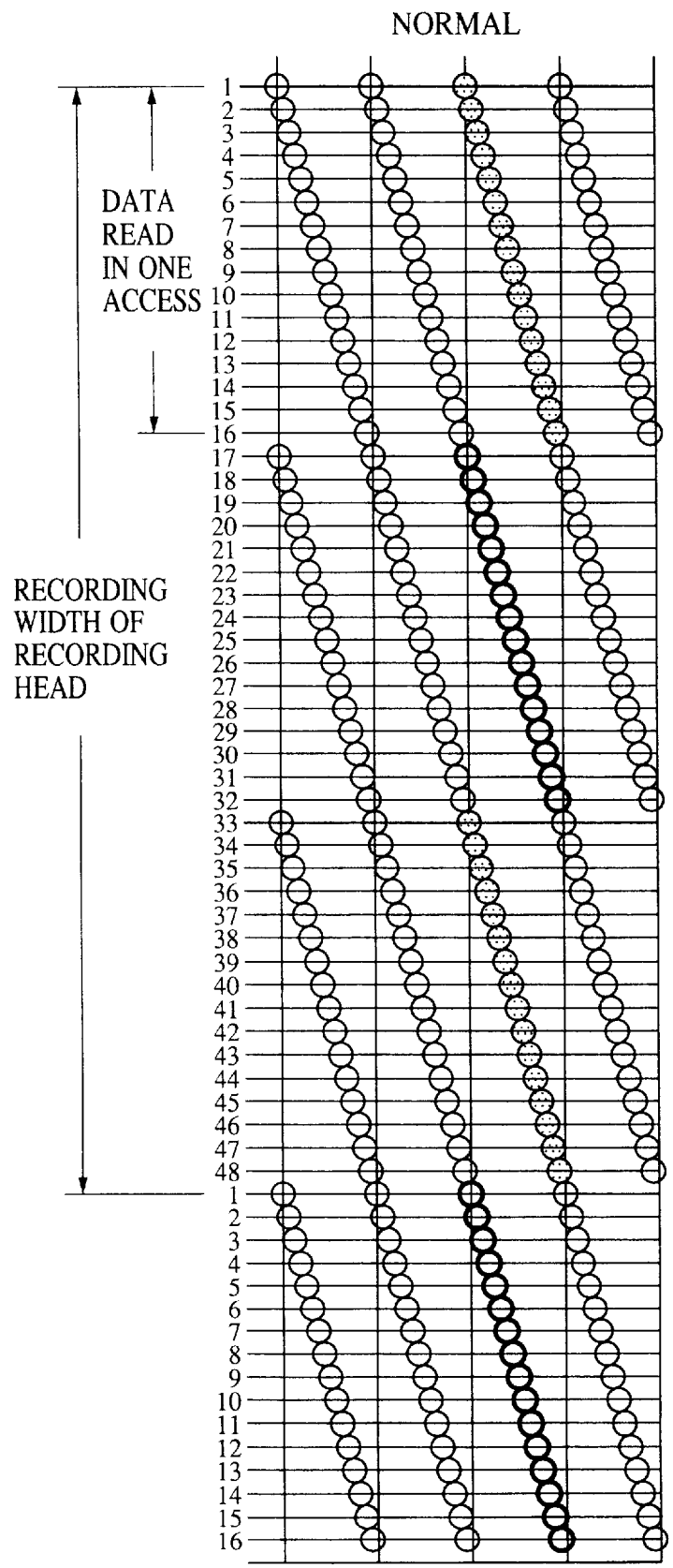
FIGS. 12A and 12B show data reading.
Figure 12B:
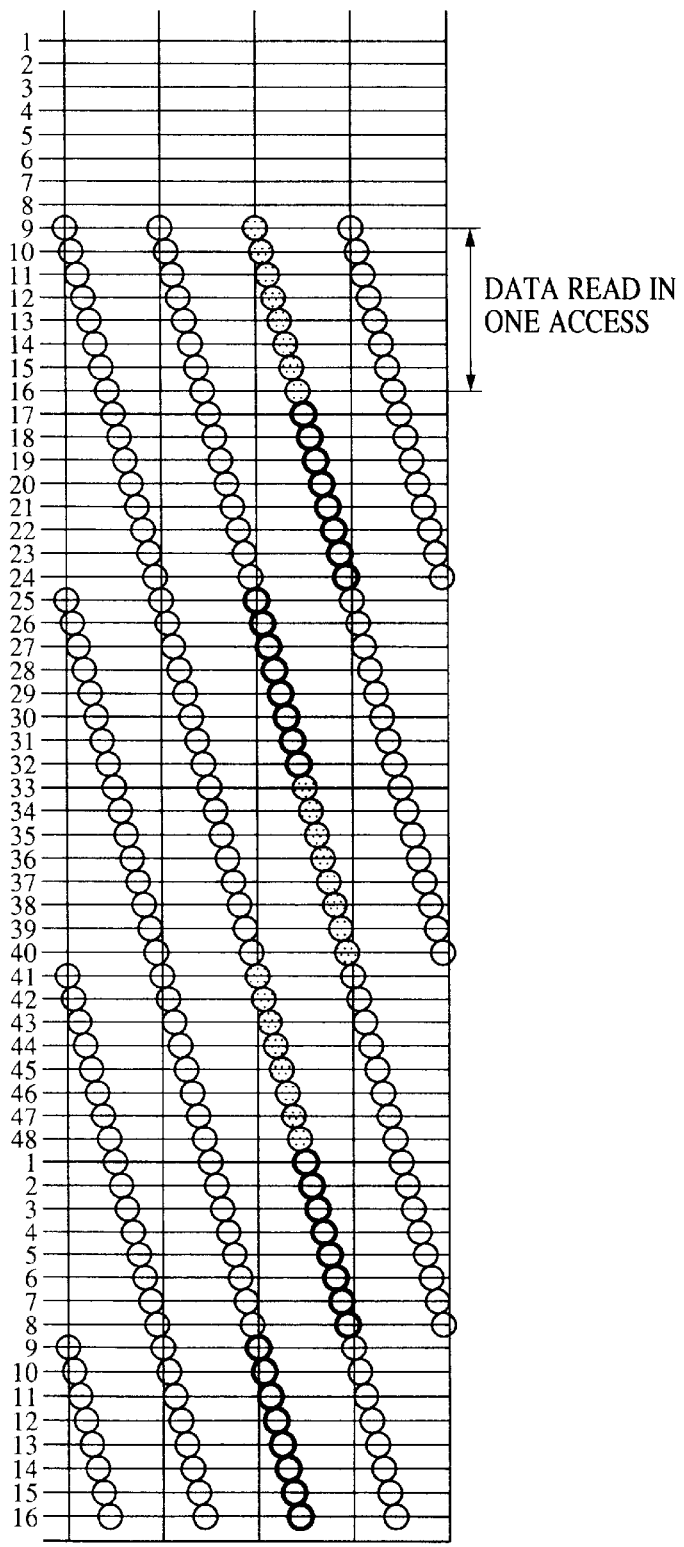

In the conventional apparatus, since the resulting 16 blocks are sequentially driven from block 1 to block 16, the block selection signals (BEi1*, BEi2*, BEi3*, and BEi4*) are operated as shown in FIG. 11 such that the periods of the block selection signals BEi1*, BEi2*, BEi3*, and BEi4* are sequentially doubled in this order.

On the other hand, in the present embodiment, when the 16 resulting blocks are driven in the order of block 5 to block 16 and then block 1 to block 4, for example, the block selection signal BEi3* is set to "on" first as shown in FIG. 6 and the block selection signal BEi4* is shifted by one fourth the period as compared with that in the conventional apparatus. The other selection signals are sent as shown in FIG. 6.

When the blocks are driven in the order of block 9 to block 16 and then block 1 to block 8, the block selection signal BEi4* is shifted by one half of the period as compared with that in the conventional apparatus and is first set to "on" as shown in FIG. 7. The other signals are sent as shown in FIG. 7.

FIGS. 8A, 8B, 9A, and 9B show recording dots obtained in recording operations in which the black-ink head 9A is controlled according to the timing charts shown in FIGS. 6 and 7.

Figure 8A:
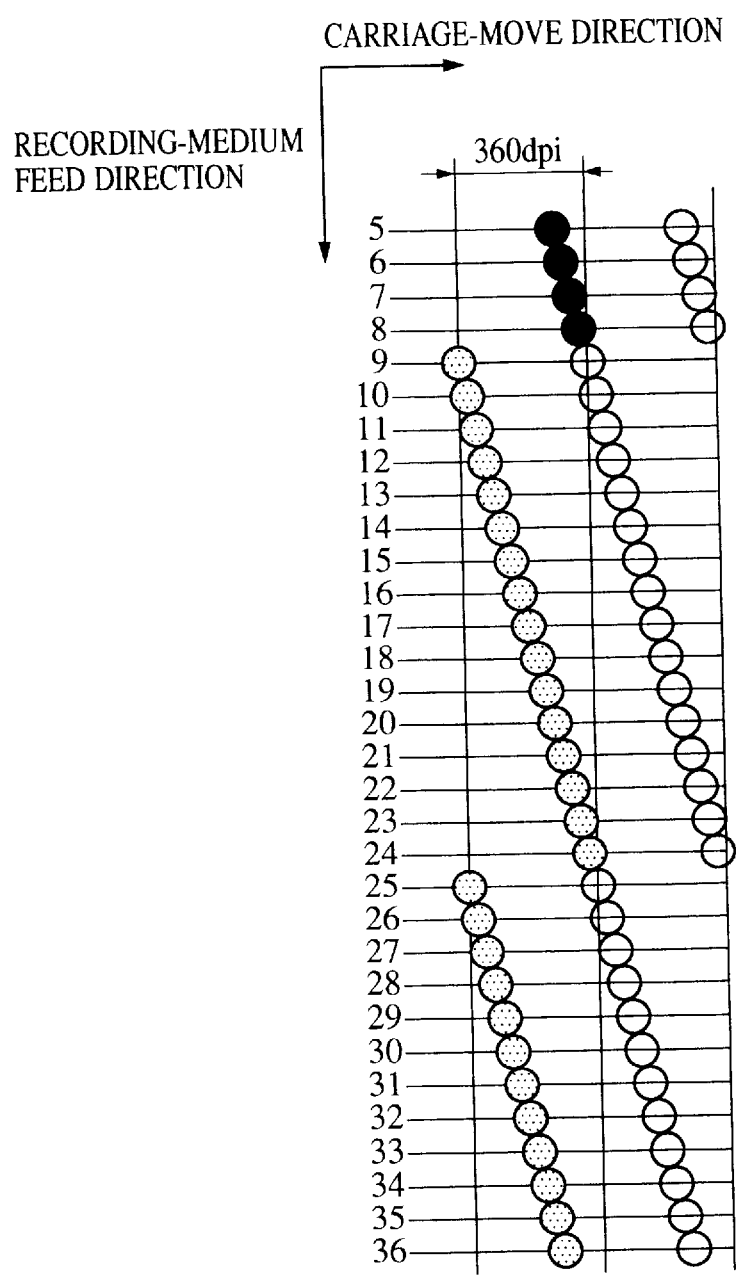
FIGS. 8A and 8B show the positions of dots recorded according to the timing illustrated in FIG. 6.
Figure 8B:
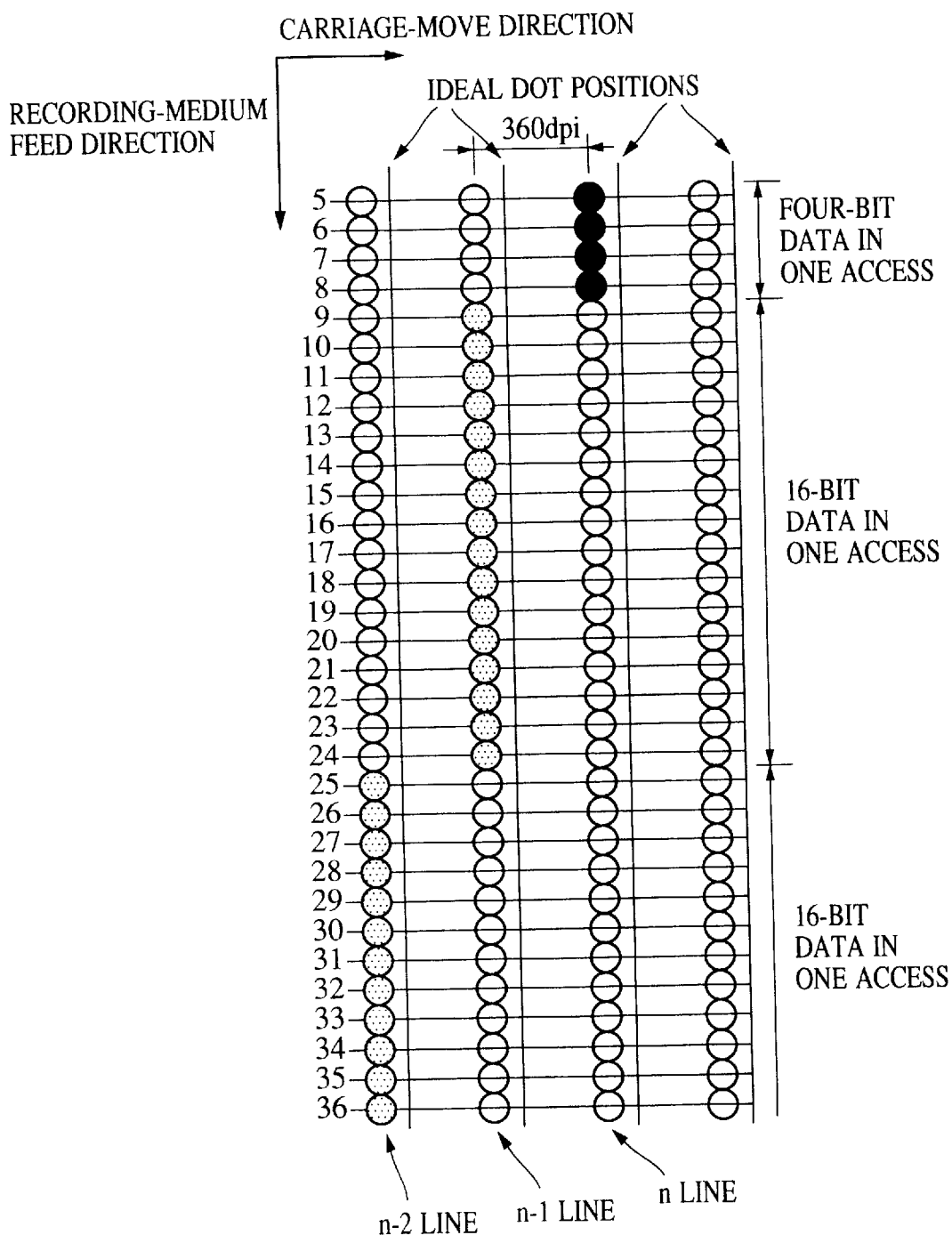
Figure 9A:
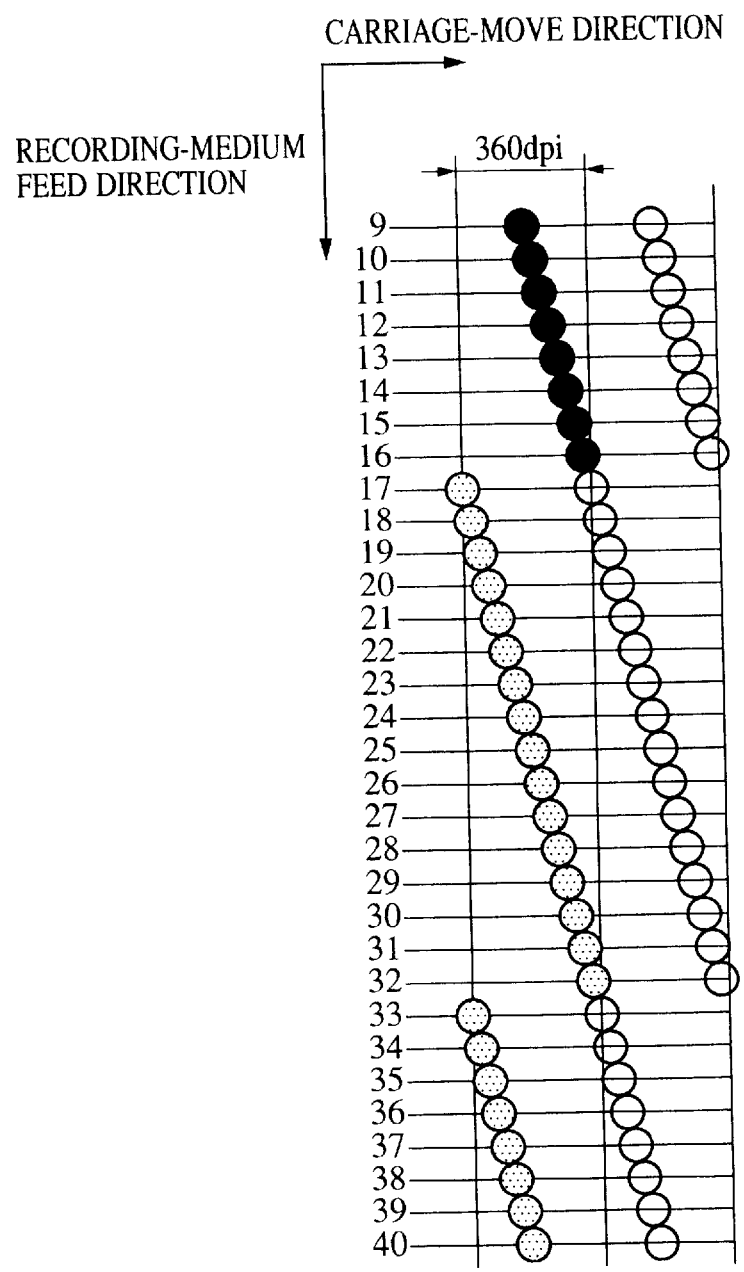
FIGS. 9A and 9B show the position of dots recorded according to the timing illustrated in FIG. 7.
Figure 9B:
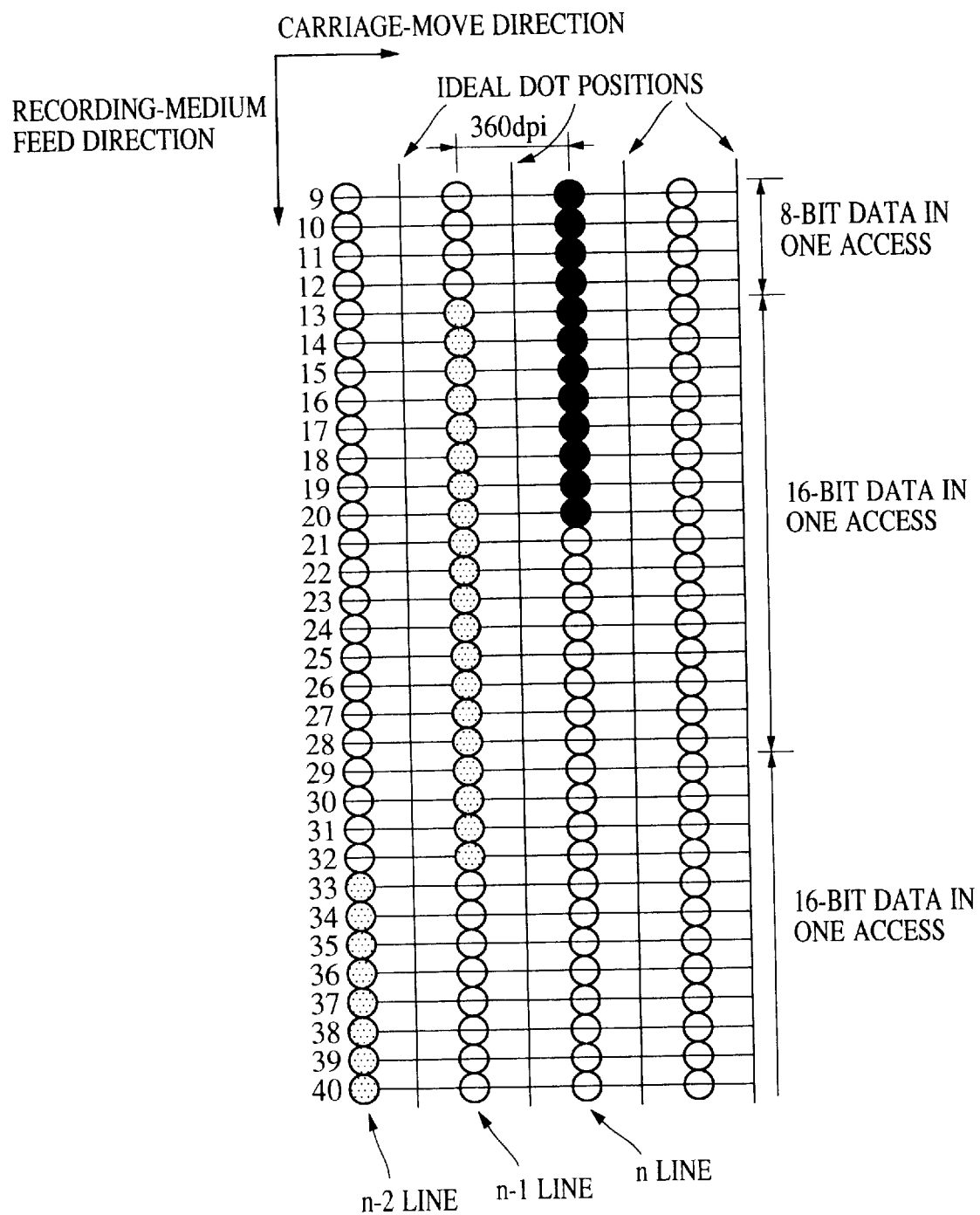
Figure 10A:
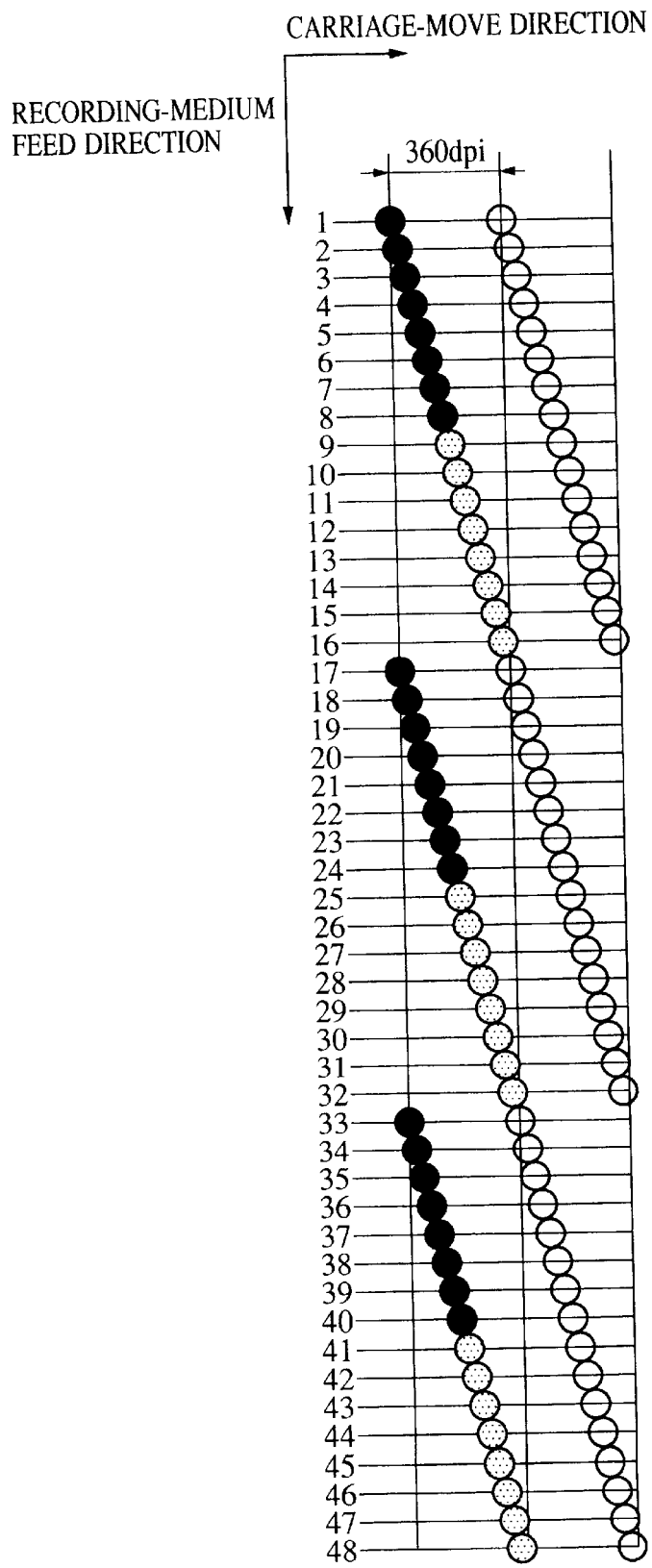
FIGS. 10A and 10B show the positions of dots recorded in a case in which recording is performed with 48 recording elements provided for a recording head being divided into 16 blocks.
Figure 10B:
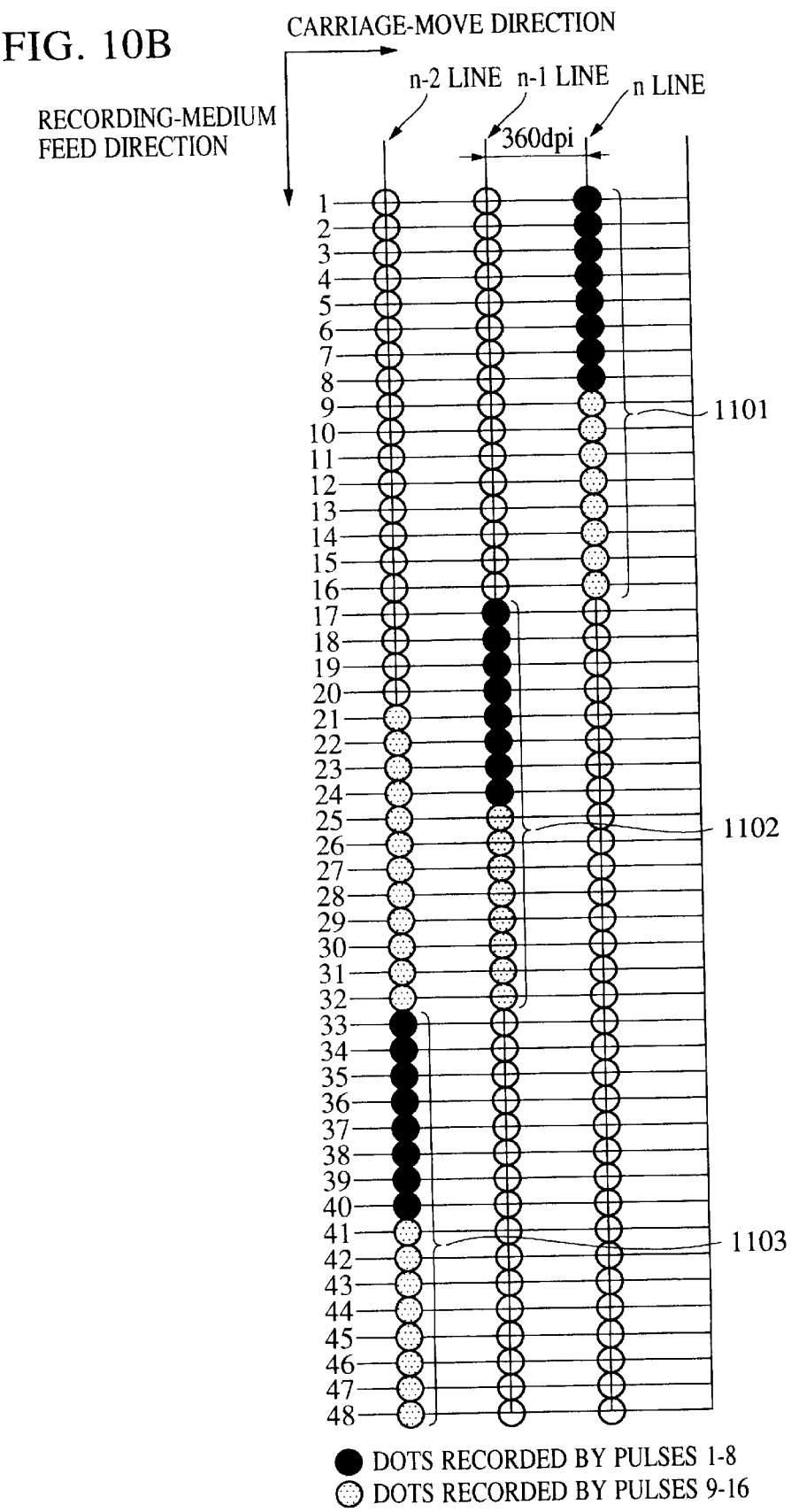

FIG. 8A and FIG. 9A indicate recording positions in a case in which the ink discharging outlets of the recording heads are arranged in parallel to the direction in which a recording medium is fed. FIG. 8B and FIG. 9B indicate recording positions in a case in which the ink discharging outlets of the recording heads are arranged at an angle in relation to the direction in which a recording medium is fed. Numerals at the left end indicate the numbers of the recording elements used for recording.

When the drive starts at block 5 as shown in FIG. 6, recording starts at a position shifted by four dots in the recording elements, namely, at the recording element 5, as shown in FIG. 8A. When the drive starts at block 9, as shown in FIG. 7, recording starts at a position shifted by eight dots in the recording elements, namely, at the recording element 9, as shown in FIG. 9A.

The positions of recording dots are shifted from the ideal positions in FIG. 8B and FIG. 9B. This is because the nozzle positions are set such that they are located at the ideal positions in a case in which the recording element corresponding to block 1 is first driven when the ink discharging outlets are arranged at an angle. This shift can be easily corrected by delaying the timing of the start of recording. When a stepper motor is used as the carriage motor and open-loop control is performed, for example, the timing of recording start is simply brought forward to correct the shift.

When the recording start position shifts (namely, recording starts at a recording element other than recording element 1) in the conventional apparatus as described before, the number of times data buffer is accessed increases. In this embodiment, however, when recording starts with four dots shifted as shown in FIG. 8B, four bits in the n-th line data are read from the RAM 25 for the recording elements 5 to 8, 16 bits in the n-1-th line data are read for the recording elements 9 to 24, 16 bits in the n-2-th line data are read for the recording elements 25 to 40, and eight bits in the n-3-th line data are read for the recording elements 41 to 48. Therefore, it is necessary to access the RAM 25 four times in one cycle of the recording operation.

When recording starts with eight dots shifted as shown in FIG. 9B, eight bits in the n-th line data are read from the RAM 25 for the recording elements 9 to 16, 16 bits in the n-1-th line data are read for the recording elements 17 to 32, and 16 bits in the n-2-th line data are read for the recording elements 33 to 48. Therefore, it is necessary to access the RAM 25 three times in one cycle of recording operation.

According to the present embodiment, by changing the sequence of block selection in a recording operation according to a shift in the recording start position, the number of times data buffers such as a RAM are accessed in one recording cycle can be reduced. The time required for data access is therefore reduced, and overall recording performance improves.

While the recording head assembly in which a plurality of recording elements are arranged at an angle in relation to the direction in which a recording medium is fed reciprocates in the direction perpendicular to the feed direction in a recording operation, storage means for storing recording data is accessed to transfer the stored recording data to the recording head assembly. As described above, according to the present invention, since the sequence of the block drive is changed such that the number of times the storage means is accessed becomes the minimum, according to the recording-start position in a plurality of recording elements which are divided into a plurality of blocks, and the recording elements are sequentially driven in units of blocks for recording according to the transferred recording data, the number of times the storage means is accessed can be substantially reduced even if the recording-start position shifts.

Therefore, recording is performed at a higher speed even with the recording heads in which a plurality of recording elements is arranged at an angle in relation to the direction in which the recording medium is fed being used in order to maintain high recording image quality.

The present invention brings about excellent effects particularly in a recording head and a recording device of the ink jet system using a thermal energy among the ink jet recording systems.

As to its representative construction and principle, for example, one practiced by use of the basic principle disclosed in, for instance, U.S. Pat. Nos. 4,723,129 and 4,740,796 is preferred. The above system is applicable to either one of the so-called on-demand type and the continuous type. Particularly, the case of the on-demand type is effective because, by applying at least one driving signal which gives rapid temperature elevation exceeding nucleus boiling corresponding to the recording information on electrothermal converting elements arranged in a range corresponding to the sheet or liquid channels holding liquid (ink), a heat energy is generated by the electrothermal converting elements to effect film boiling on the heat acting surface of the recording head, and consequently the bubbles within the liquid (ink) can be formed in correspondence to the driving signals one by one. By discharging the liquid (ink) through a discharge port by growth and shrinkage of the bubble, at least one droplet is formed. By making the driving signals into pulse shapes, growth and shrinkage of the bubble can be effected instantly and adequately to accomplish more preferably discharging of the liquid (ink) particularly excellent in accordance with characteristics. As the driving signals of such pulse shapes, the signals as disclosed in U.S. Pat. Nos. 4,463,359 and 4,345,262 are suitable. Further excellent recording can be performed by using the conditions described in U.S. Pat. No. 4,313,124 of the invention concerning the temperature elevation rate of the above-mentioned heat acting surface.

As a construction of the recording head, in addition to the combined construction of a discharging orifice, a liquid channel, and an electrothermal converting element (linear liquid channel or right angle liquid channel) as disclosed in the above specifications, the construction by use of U.S. Pat. Nos. 4,558,333 and 4,459,600 disclosing the construction having the heat acting portion arranged in the flexed region is also included in the invention. The present invention can be also effectively constructed as disclosed in JP-A-59-123670 which discloses the construction using a slit common to a plurality of electrothermal converting elements as a discharging portion of the electrothermal converting element or JP-A-59-138461 which discloses the construction having the opening for absorbing a pressure wave of a heat energy corresponding to the discharging portion.

What is claimed is:

1. A recording apparatus for performing recording on a recording medium by reciprocating, in the direction perpendicular to the direction in which said recording medium is fed, a recording head in which a plurality of recording elements are arranged at an angle in relation to the feed direction, said recording apparatus comprising:

storage means for storing recording data;

transfer means for accessing said storage means to transfer stored recording data to said recording head;

recording means for dividing said plurality of recording elements into a plurality of blocks, and sequentially driving said plurality of recording elements in units of blocks for recording according to the recording data transferred by said transfer means; and control means for changing the sequential driving of said plurality of recording elements in units of blocks according to the position of a recording element at an end of an array of said plurality of recording elements to be used for recording, when recording is performed without using some recording elements from the end of an array of said plurality of recording elements.

2. A recording apparatus according to claim 1, wherein said transfer means includes a data bus having a specified data-transfer width, reads recording data at said data-transfer width or less in one access to said storage means, and transfers the data through said data bus.

3. A recording apparatus according to claim 2, wherein said data-transfer width is 16 bits.

4. A recording apparatus according to claim 2, wherein the minimum access count is the value obtained by dividing the number of said plurality of recording elements by the number of blocks used in one recording operation performed by said recording head, or the value plus 1.

5. A recording apparatus according to claim 1, wherein said storage means stores said recording data according to the two-dimensional pixel arrangement of an image to be formed.

6. A recording apparatus according to claim 1, further comprising feed means for feeding said recording medium.

7. A recording apparatus according to claim 1, further comprising scanning means for reciprocating said recording head.

8. A recording apparatus according to claim 1, further comprising timing control means for controlling recording-start timing.

9. A recording apparatus according to claim 8, wherein said timing control means includes position detection means for detecting the position of said recording head and delay means for delaying said recording-start timing according to positional information output from said position detection means.

10. A recording apparatus according to claim 1, wherein said recording means includes time-division driving means for dividing said plurality of recording elements in said recording head into a plurality of blocks and for driving each resulting block in a time-division manner.

11. A recording apparatus according to claim 1, wherein said control means includes changing means for changing the drive sequence of said blocks.

12. A recording means according to claim 1, wherein said recording head is a color recording head.

13. A recording apparatus according to claim 12, wherein said color recording head is an ink-jet recording head for performing recording by discharging ink, and includes a first head which discharges black ink, a second head which discharges yellow ink, a third head which discharges magenta ink, and a fourth head which discharges cyan ink.

14. A recording apparatus according to claim 1, wherein said recording head is an ink-jet recording head which discharges ink for recording.

15. A recording apparatus according to claim 14, wherein said recording head is a recording head which discharges ink with the use of thermal energy and is provided with a heat energy conversion member for generating heat energy to be supplied to the ink.

16. A recording control method for controlling a recording apparatus for performing recording on a recording medium by reciprocating a recording head in which a plurality of recording elements are arranged, wherein said recording apparatus divides said plurality of recording elements into a plurality of blocks, and sequentially drives said plurality of recording elements in units of blocks for recording, said method comprising the steps of:

storing recording data in a memory;

transferring the recording data stored in said memory to said recording head by accessing said memory;

discriminating whether recording is performed without using some recording elements from the end of an array of said plurality of recording elements;

determining the sequence of the block drive according to the position of a recording element at the end of an array of recording elements to be used for recording; and driving said recording elements on the basis of the recording data in accordance with the determined sequence of the block drive.

17. A method according to claim 16, wherein said recording head is an ink-jet recording head which discharges ink for recording.

18. A method according to claim 17, wherein said recording head is a recording head which discharges ink with the use of thermal energy and is provided with a heat energy conversion member to generate heat energy to be supplied to the ink.

* * * * *